United States Patent
Shea

[19]

[11] Patent Number: 5,909,904
[45] Date of Patent: Jun. 8, 1999

[54] FLANGE JOINT ASSEMBLIES

[75] Inventor: Lawrence E. Shea, Reno, Nev.

[73] Assignee: Shea Technology, Reno, Nev.

[21] Appl. No.: 09/122,334

[22] Filed: Jul. 24, 1998

[51] Int. Cl.$^6$ .................................................. F16L 33/00
[52] U.S. Cl. ........................ 285/405; 285/397; 285/414; 285/424
[58] Field of Search ................................. 285/405, 409, 285/414, 424, 397, 398, 371, 408, 257

[56] References Cited

U.S. PATENT DOCUMENTS

| | | | |
|---|---|---|---|
| 610,321 | 9/1898 | Davey | 285/371 |
| 714,243 | 11/1902 | Sargent | 285/371 |
| 1,358,633 | 11/1920 | Hachmann | 285/257 |
| 2,481,730 | 9/1949 | Doerr | 285/257 |
| 2,661,962 | 12/1953 | Nelson | 285/257 |
| 2,921,606 | 1/1960 | MacCauley | 285/257 |
| 4,607,867 | 8/1986 | Jansen | 285/257 |

FOREIGN PATENT DOCUMENTS 289902  5/1928  United Kingdom ................... 285/371

*Primary Examiner*—Eric K. Nicholson
*Attorney, Agent, or Firm*—William F. Hamrock

[57] ABSTRACT

The invention relates to a flange joint assembly for connecting together cylindrical duct sections. A tubular slip collar fits within opposing sections which engage an exterior projecting bead encircling the exterior of the slip collar. Opposing flange clamps are mounted on the ducts having leaf elements pressing against the duct surfaces. Opposing band clamps are mounted around the leaf elements securing the leaf elements to the duct surfaces. Opposing V-band ring locking devices encircle the flange clamps. In the alternative, Van-Stone flange rings secure the flange clamps together by means of locking bolts.

8 Claims, 6 Drawing Sheets

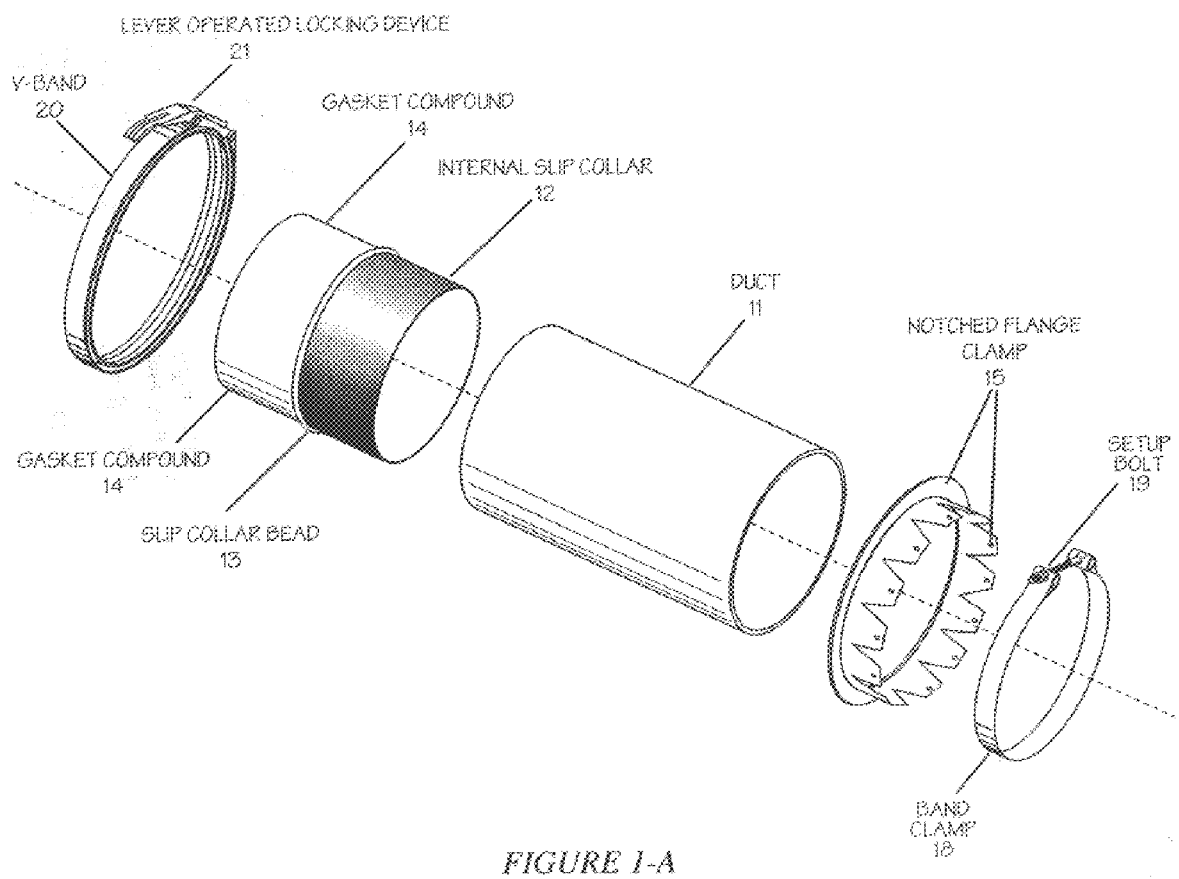
FIGURE 1-A

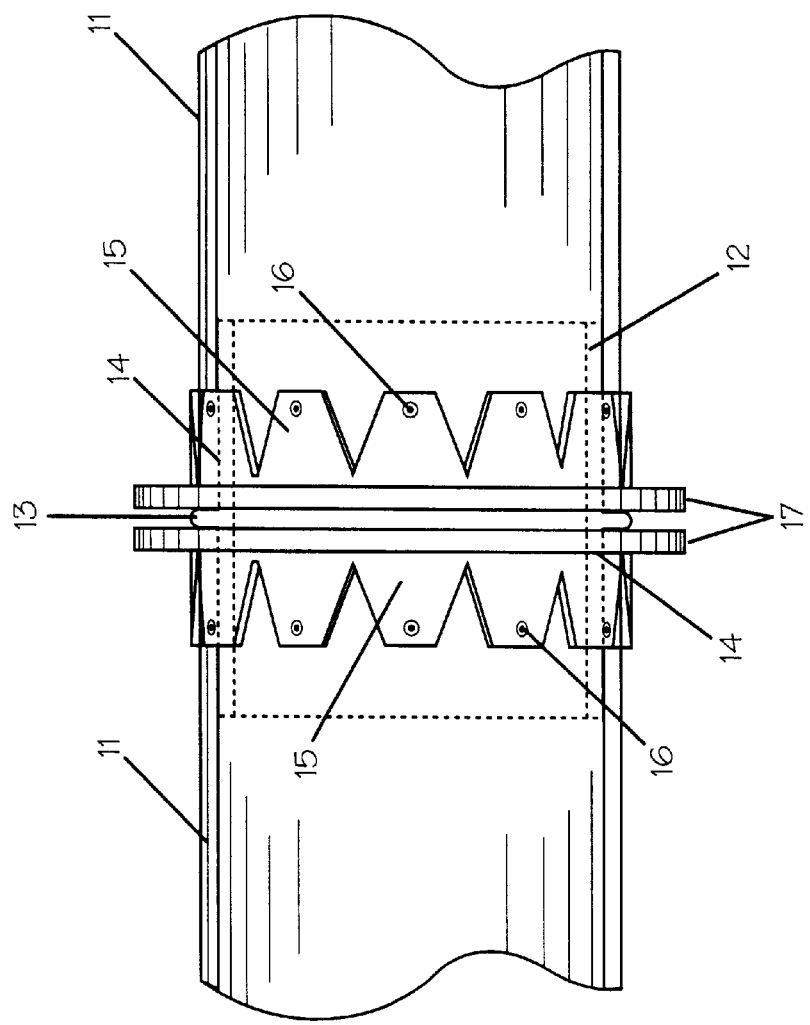
FIGURE 2
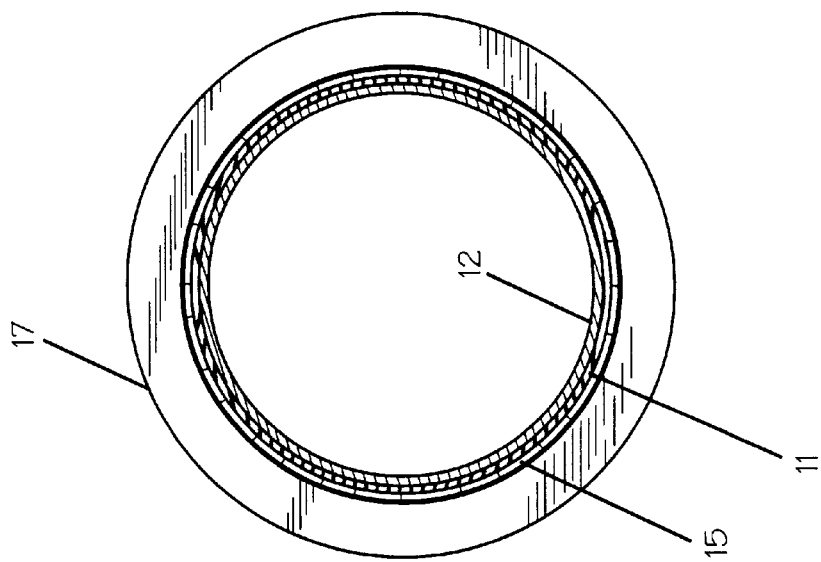
FIGURE 2-A

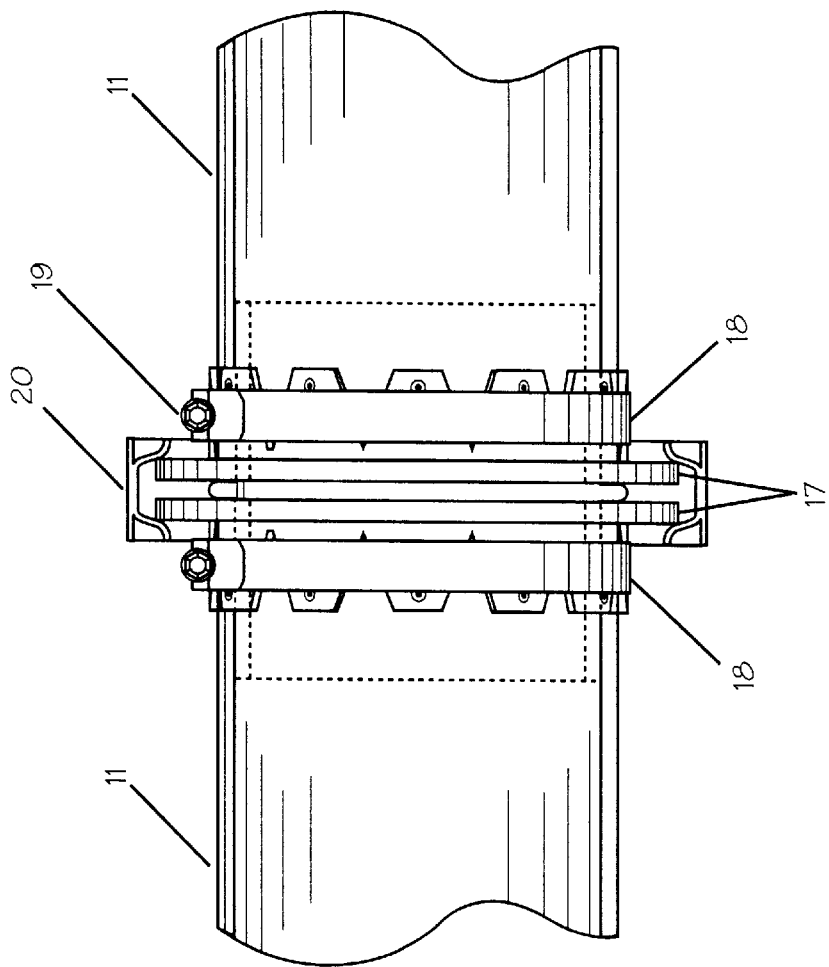
FIGURE 3
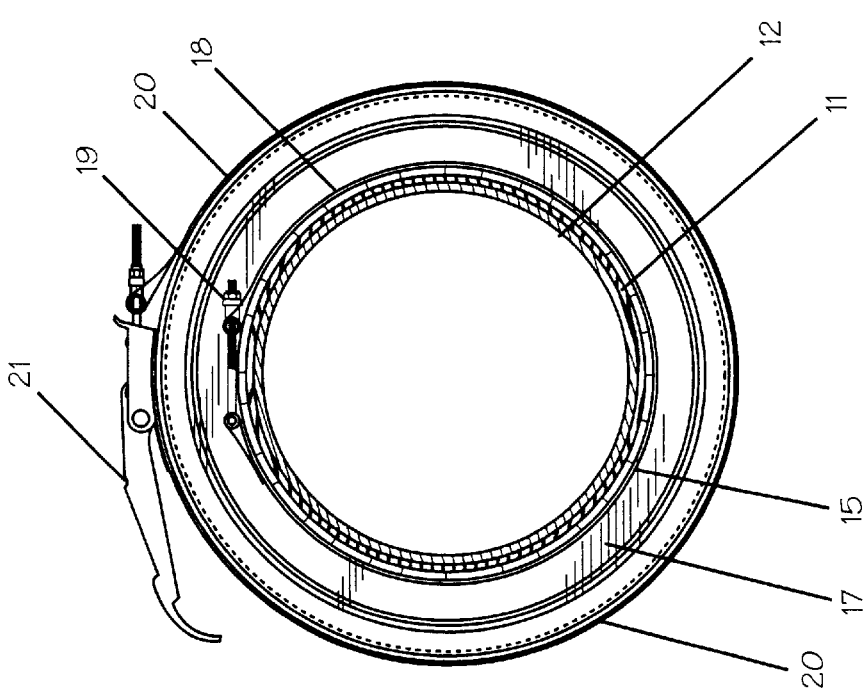
FIGURE 3-A

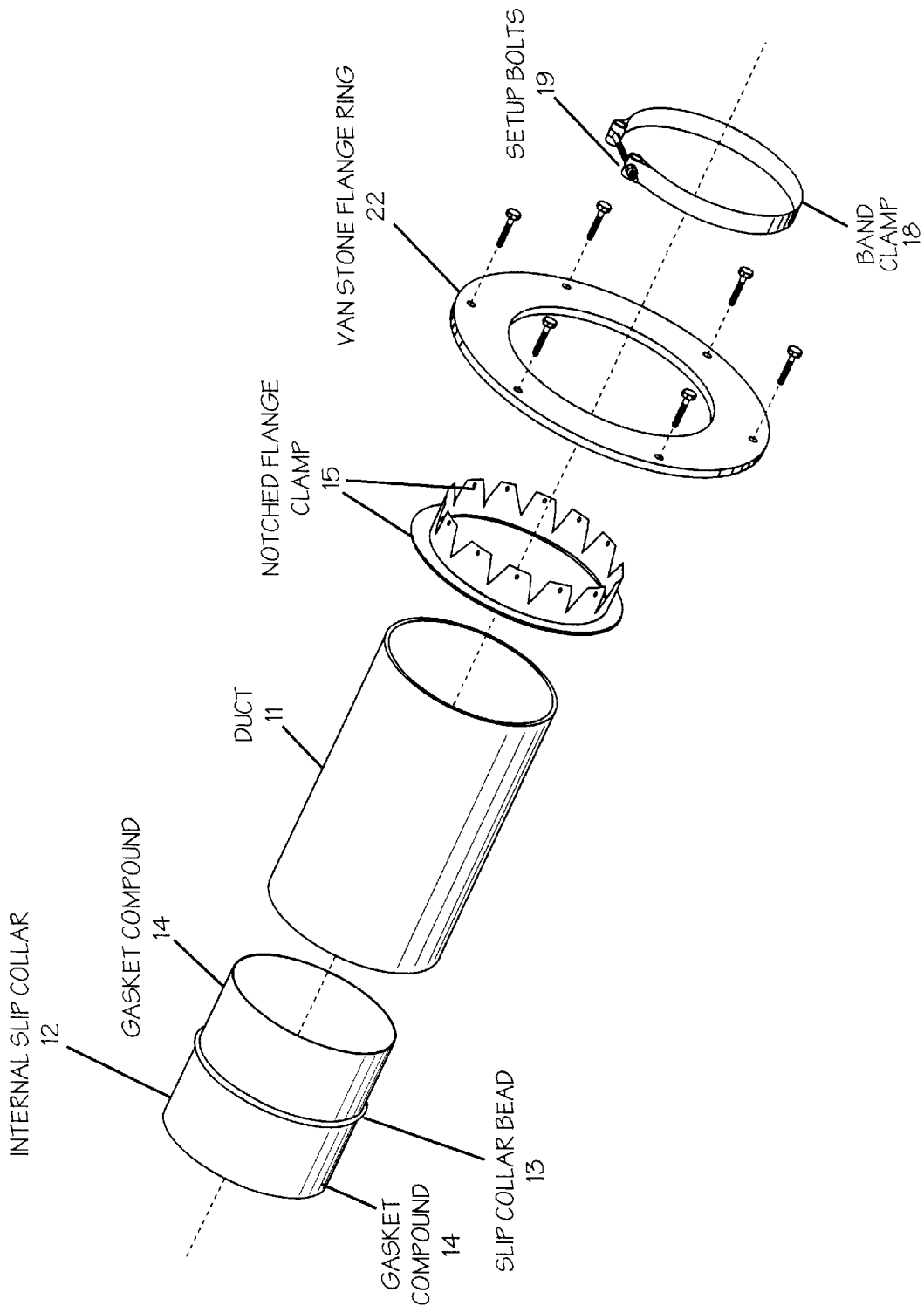
FIGURE 4-A

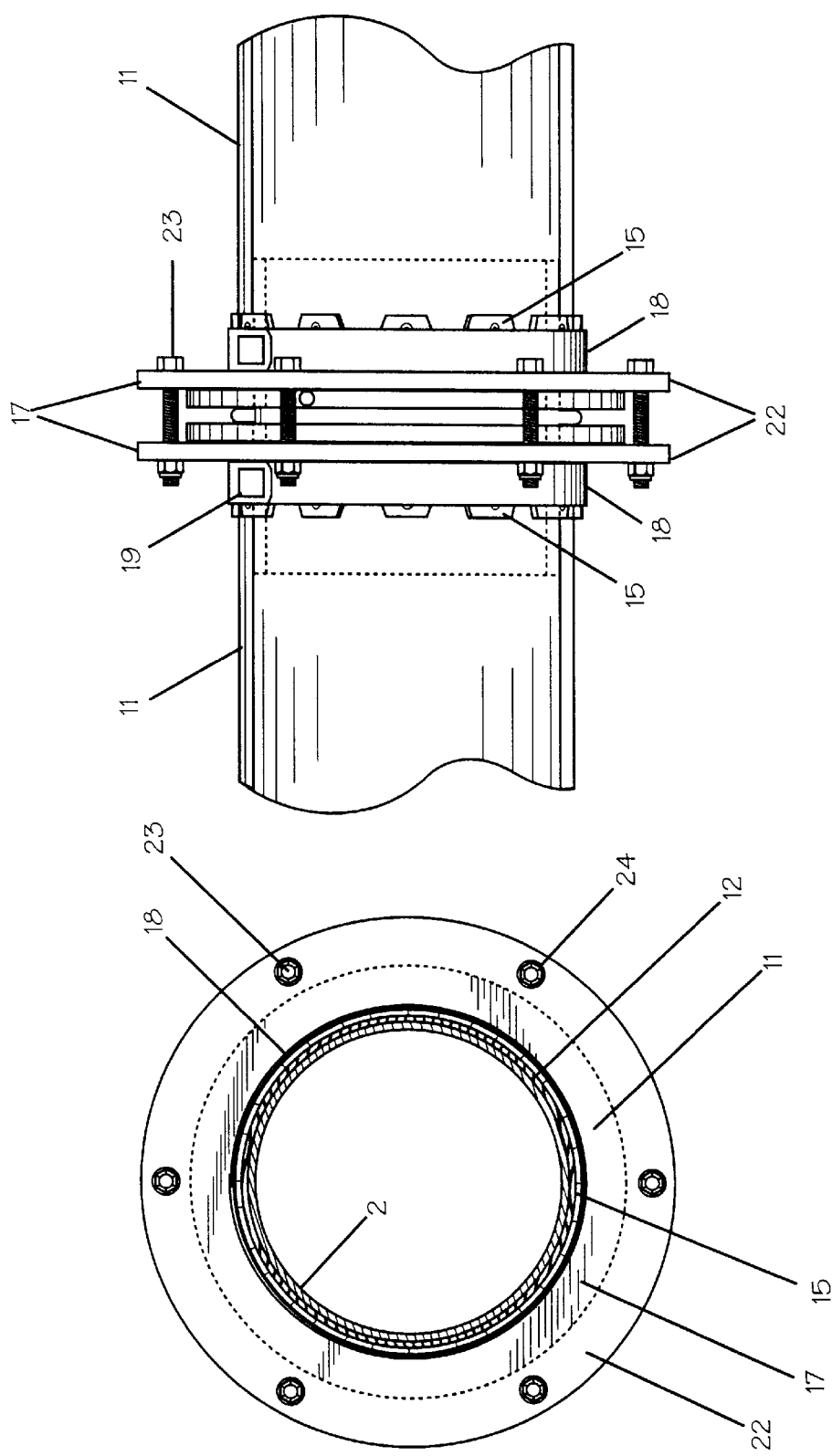

FLANGE JOINT ASSEMBLIES

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

There is a large quantity of plastic ductwork and piping used in industry because of their beneficial corrosion resistance to a broad variety of aggressive chemicals. There is a large variety of plastic materials that are used for this purpose, including but not limited to polyvinyl chloride, polypropylene, polyethylene, and fiberglass reinforced plastics using a variety of thermoset resins.

Each of these presents its own challenges in terms of making field joints to connect the various section of ductwork and piping together in the field. Small diameter thermoplastic sections are generally assembled with the aid of adhesives; large diameter duct or pipe sections are generally assembled with the aid of permanent flanges made of the same materials which have been chemically welded to the duct or pipe sections. In fiberglass work, the conventional joint making mode is to use what is commonly known as "bell and spigot" joints. This is an industry term for the treatment of the ends of various sections of straight duct, fittings, or a combination of the two. One end, left as a trimmed raw edge the same size as the diameter of the duct or pipe, is the "small end or spigot end." The opposite end of the fitting or duct is enlarged, known as a bell, into which the spigot or small end fits.

In the thermoplastic field on small diameter sections a standard glue or resin may be used to coat the exterior of the spigot and/or the interior of the bell. This glue generally "melts" the materials so they bond very tightly together. The same type of joint may be used in fiberglass reinforced plastics; however, here, the bell and spigot are merely an aid to alignment in the field. In the case of the fiberglass materials, the duct and/or fitting close to the joint must first be sanded before the application of thermoset resin and glass fabric. The joint must be wrapped with various layers of glass saturated with resin in order to complete the joint. Once the resin hardens, the joint is set.

All of these non-metallic materials may be connected with flanges made of the basic virgin material from which the duct, pipe and/or fittings are made. For example, in the case of thermoplastics, and as an integral part of the duct or pipe, particularly on large diameters, a flange may be chemically welded to the ends of each duct, pipe and/or fitting, or may be made as an integral part of the duct or pipe, and these flanges are subsequently joined in the field. Such flanged joints require drilling of bolt holes, and the use of bolt sets and gaskets which connect flanged joints together in the field.

A similar operation may also occur with fiberglass reinforced plastics, both in ductwork and piping, where, at the ends of each section of duct and/or fitting, there may be an integrally bonded flange made of the fiberglass material. In other words, if a polyester or vinyl ester thermoset resin is used, the flange would be made out of the same resin and glass as the basic product. For example, SMACNA (Sheet Metal Air Conditioning Contractors National Association, Inc.) publishes manuals which deal with things such as PVC and fiberglass reinforced plastic ductwork. In these various manuals, specific recommendations are provided with respect to the thickness of the duct or flange, the sizes of the flange in relation to the duct or piping to which it is connected, the specific manner of making an integral bond between the duct or pipe and flange are shown, and specific dimensions are provided with respect to the size and location of the bolt holes around the bolt-hole circle where parts are to be joined.

All of these methods of making non-metallic field joint connections have deficiencies or certain dis-benefits which may make them undesirable in certain circumstances.

For many years, whether it be in marine services, petroleum services, pharmaceutical, waste water treatment, plating shops or semi-conductor services, etc., it has always been considered desirable to use flanged joints. The problem with flanged joints, however, is that the dimensions of flange face to flange face sections used in the field are very critical. It is common that buildings, as they are built, are subject to myriad changes so that one cannot apply pencil to paper in determining duct or pipe section lengths and expect to solve all problems. A large number of changes occur in the field before the building of a facility is completed which can place a duct or pipe system out of alignment and can cost millions of dollars to correct the problem.

Quite often, it would be preferred to use flanged joint sections without the inconvenience of costly, time consuming pre-determination of flange-face to flange-face dimensions for every single piece of material that goes into an industrial complex. It is also desirable to have a last-minute flexibility in this regard, and to be able to make adjustments in the field, so that any time that a flange/flange dimension might change, this change might be accommodated at the job-site quite readily after the changes of dimensions have occurred on a last-minute basis.

One of the largest single users of non-metallic material for ductwork and piping is the semiconductor industry. Non-metallic ductwork and piping are used for corrosion-resistant benefits. There are some unusual standards applied in the semiconductor industry, because of the manner in which the industry builds its buildings and systems. These semiconductor facilities use "clean rooms" to produce their chips. The interior finished areas are noted for their cleanliness and there is close control of any methods of construction or installations that may compromise super-clean environments. It is not uncommon for people to worry about dimensions of dirt particles such as 0.10 to 0.30 microns. A human hair in such an environment is considered an enormously large contaminant which could cause significant dollar losses.

In this atmosphere of such ultra-clean environments, there is also great concern about such things as odors, smoke or out-gassing of aggressive chemicals, which may destroy chips in the process of being made. Because of this, any activity that requires sawing, drilling, coating, painting, etc. is not desirable or permitted in some areas.

Thus, methods of fabrication and installations for "ordinary" services such as ductwork and piping become extremely complicated, because semiconductor or pharmaceutical industries absolutely will not tolerate what, not too many decades ago, was accepted as "common practice." Also, buildings are constructed on a "fast track", or accelerated schedule. It is not unusual for a $2 billion facility to be constructed and put in operation in 8 months. Such speed of construction reduces the financial burden on an owner, but it also creates problems where much construction must be done on the fly. There is great pressure to reduce time consumption on things like field joints for ductwork and piping.

It becomes desirable then, to create a means of joining ductwork and piping which does not require injurious odors from resins or adhesives, does not cause dust contamination by injurious sanding with resulting abrasive dust which must be cleaned up, or does not require the application of fiberglass materials which will spew forth particulate matter, nor the problems caused by dimensional tolerance mistakes, where parts may be a few inches too short or too long, and new replacement parts must be made at a remote factory. Such mistakes cause loss of time, which is loss of money. Being able to measure distances of points of connection in the field as the building is in fact being erected and thereafter being able to produce a flanged connection quickly, efficiently, and at low cost, is of great benefit, both in time and in reducing the burden of financing a project. Avoiding even one day's delay because of a goof might save an owner as much as a half-million dollars. Little things can be enormously costly. The solution to all these problems is the quick flange joint of this invention.

BRIEF SUMMARY OF THE INVENTION

Briefly stated, the present invention provides a flange joint assembly for connecting two sections of ducts or pipes, hereinafter referred to as ducts. Two sections of ducts are joined together by means of an internal tubular slip collar which fits within the adjoining ends of the ducts and engaging an exterior projecting bead encircling the exterior of the tubular slip collar. The interior ends of the ducts and the exterior surface of the tubular slip collar have been coated with a casket compound to obtain a tight seal. Two opposing notched metal flange clamps, preferably sheet metal clamps, are mounted on the ducts with the notched leaf elements pressing against the exterior duct surface. Two opposing band clamps are mounted around the notched leaf elements securing the leaf elements to the ducts exterior surfaces with the notched projections penetrating the exterior surfaces. In one embodi-ment, a V-band ring locking devices encircle the metal flange ring clamps securing them together which is often done for smaller ducts. In another embodiment two Van-Stone flange rings secure the opposing flange ring clamps together by means of bolts or similar securing means.

BRIEF DESCRIPTION OF THE DRAWINGS

For a more complete understanding of the present invention and the advantages thereof, reference is made to the following description taken in conjunction with the accompanying drawings in which:

FIG. 1A is an exploded partial perspective view of the flange joint assembly showing a V-band locking device.

FIG. 2 is a partial sectional view of the joined duct or pipe sections with the notched flange clamp and flange rings.

FIG. 2a is a cross sectional view of the flange joint assembly of FIG. 2.

FIG. 3 is a partial sectional view of the joined duct and pipe assembly showing the V-band ring.

FIG. 3A is a cross sectional view of the flange joint showing the lever handle locking device. locking device.

FIG. 4A is an exploded partial perspective view of the flange joint assembly showing a Van-Stone flange ring.

FIG. 5 is a partial sectional view of the joined duct and pipe assembly showing the Van-Stone flange rings.

FIG. 5A is a cross sectional view of the joined duct and pipe assembly showing the Van-Stone flange ring.

DETAILED DESCRIPTION OF THE INVENTION

Figure 1:
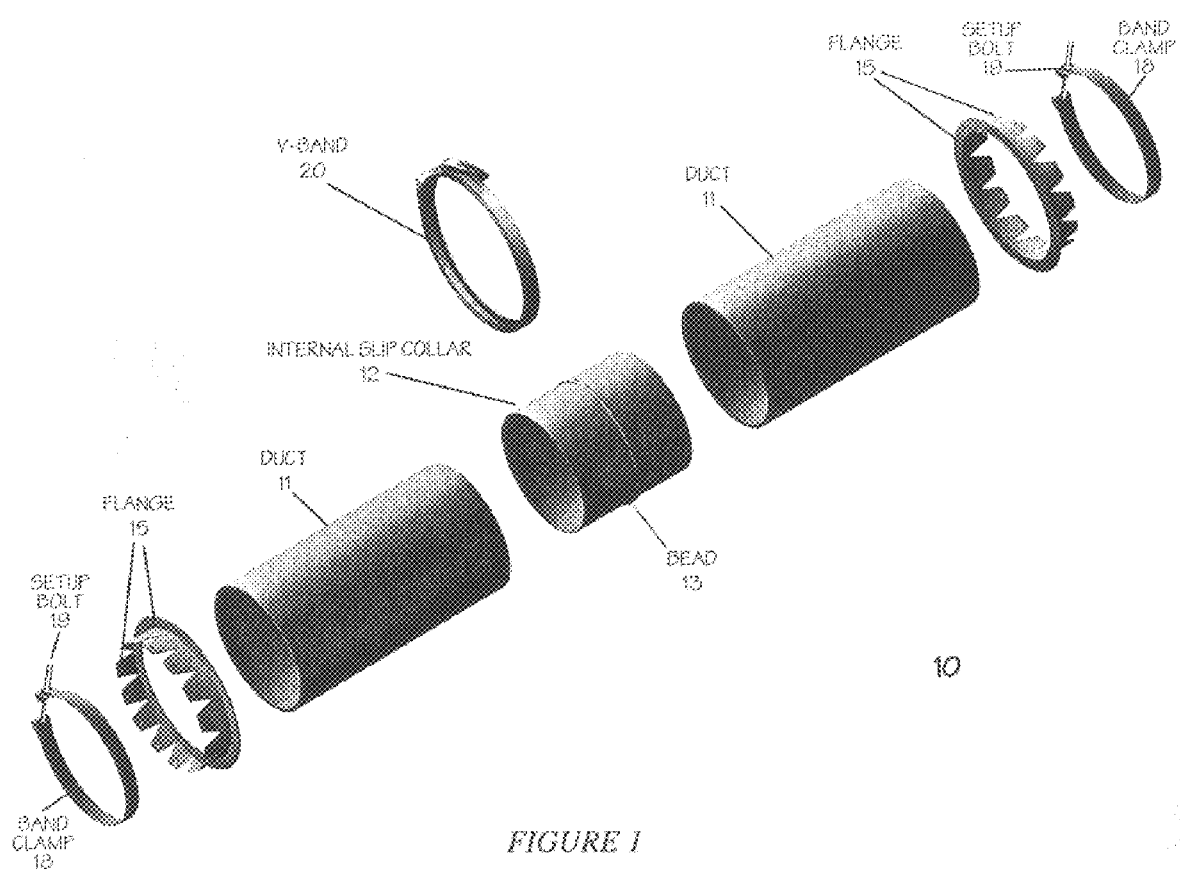
FIG. 1 is an exploded perspective view of a flange joint assembly for connecting duct or pipe sections in one embodiment of the invention.

Turning now to the drawings, and in particular to FIGS. 1, 1A, 2, 2A, 3 and 3A, there is shown the flange joint assembly. One embodiment of the invention uses a V-band ring or band clamp for smaller diameter ducts or pipes. In FIGS. 4A, 5 and 5A, there is shown another embodiment of the invention using a Van-Stone flange ring for larger diameter ducts or pipes.

In FIGS. 1 and 1A, two sections of duct 11 are first joined together with the aid of internal slip collar 12 which has an upstanding bead 13 at its centerline. The exterior portion of the internal slip collar is first coated with gasket compound 14 shown in FIG. 1A which preferably contains fluorocarbons. Gasket compound 14 is smeared on the exterior of internal slip collar 12 and on the interior of duct 11 for a few inches from the edge. Then the two sections of duct are pushed together over the slip collar until they engage the bead 13 on the collar. This process smears the gasket compound and pushes it out from the interior duct/collar mounting to the point where it accumulates at the bead between the joints as seen in FIGS. 2 and 2A. In the event that there is too much clearance between the exterior of the collar and the duct, one or more layers of coated fabric, not shown, can be wrapped around the slip collar ends. Prior to this coated fabric wrapping, however, notched flange clamp 15 has been placed on each duct or pipe section, as well as, band clamps 18 with pretension bolts 19 as discussed below.

Internal slip collar 12 is shown within the interior of duct 11 with bead 13 projecting outwardly having its surface to be even with the top surface of the engaging ducts. Gasket compound 14 is squeezed outwardly so that it accumulates on bead 13 from the engaging surfaces of notched flange clamp 15 and flange ring 17 as shown in FIGS. 2 and 2A.

An important feature of the invention is that notched flange clamp 15 can be manufactured in large volumes for all anticipated diameters. The notched flange clamp 15 embodies a steel sheet metal ring base having a multiple leaves extending therefrom. The steel leaf surface provides the needed flexibility to snugly fit within the joint assembly.

Each leaf of the notched flange clamp is pierced with a counterpunch device which causes projections 16 to protrude inwardly toward the outer surface of the duct or pipe. Alternative modes of producing a grip are knurling, crimped edges or serrations. Flange rings 17 having a flat annularing surface are secured to the base of notched flange clamps 15 by welding or a other securing procedure.

After the notched flange clamps 15/flange rings 17 component have been placed on the ducts as seen in FIGS. 2 and 2A, band clamps 18 having an annular sheet metal ring joined together by set-up bolt 19 are placed around the perimeter of the notched flange clamps which tighten down the leaves of the notched flange clamp as seen in FIGS. 3 and 3A. The projection 16 seen in FIGS. 2, 2A and 5 on each leaf is forced down into the exterior wall surface of the duct especially where the duct is made of thermoplastic or fiberglass. There is a partial penetration of the projections into the duct wall which prevents separation of the ducts under modest pressure. This also helps to keep the notched flange clamps 15 flange rings 17 aligned in juxtaposition one to the other. Band set-up bolts 19 can be of the constant-torque type which can be adjusted down to a specific pressure or torque. This is helpful in holding variable air or liquid pressures constant and is also particularly useful in the event of fires to be discussed below.

Instead of using band clamps 18, use can be made of conventional band strap, strapping tool and clamp 19 shown in FIG. 5.

The next step is using the V-band ring 20 shown with lever handle locking device 21 in FIGS. 1, 1A and 3. As with the other components of the flange clamp assembly, the V-band ring 20 and lever handle locking device 21 must be put on the before the assembly is made, and then moved into position at the appropriate time. V-band ring 20 may be hinged, and when lever handle 21 is pulled upwardly, it opens the V-band ring so it can very easily be put over the flange rings 17. By placing the interior of the V-band ring 20 and pushing the lever handle 21 downwardly, it snaps the V-band ring into a tight fit around the flange rings 17 as shown in FIG. 3.

FIGS. 4A and 5 are directed to an alternative method of making these field applied flange connections. As discussed above, the field applied flange connections shown in FIGS. 1, 1A and 3 are generally applicable to smaller diameter ducts, usually about twenty four to thirty inches in diameter or less. However, for larger ducts, for example ducts about forty eight inches in diameter, the V-band ring 20 can become somewhat unwieldly, in which event, a Vaan-Stone type of flange ring may be used. It is to be understood, however, that the V-band clamp 20 and the Van-Stone clamp 22 can be used whenever appropriate.

Seen in FIGS. 4A and 5 are annular rings 22 such as Van-Stone flange rings have been placed over the notched flange clamp 15 while engaging the outer surface of flange ring 17. A number of conventional bolts 13 are inserted through the opposing bolt holes 24 in the annular rings to pull the assembly together. As the bolts 23 are tightened, annular rings 22 are pushed against flange rings 17 attached to flange clamps 15 which have been tightly affixed to the ductwork causing the entire assembly to be secured together. It is bolt hole 24 pattern and bolt 23 members which combine to produce the properly secured assembly.

In using both of the field applied flange connections as discussed above, full face or rope type gaskets, not shown, may be inserted between flange rings 17 or the annular rings 22 if desired.

COMMERCIAL BENEFITS

In addition to nonmetallic ducts, such as fiberglass being commonly used for corrosive vapor exhaust systems, coated metal ducts are also used. Common coatings based on fluorpolymers are Teflon and Halar. These coatings are spray-applied and then sintered at high temperature. It is essential that these powdered coatings be applied evenly and be free of pinholes. An operator must hold the gun, and his arm is only so long. The normal distance of putting the gun into the interior of the duct is two feet; thus, duct section lengths are only four feet long for coated metal ducts. Flanged joints are used for field connections, thus there are joints every four feet. For nonmetallic ducts, fiberglass is made from the inside out, and duct lengths may be as long as sixty feet before a field joint need be made. Common lengths of fiberglass ducts are twenty feet. Thus, there are only two joints required, versus five joints for an equal length of coated metal. If the fiberglass duct is forty feet long, there are still only two two joints required, versus ten joints for the coated metal ducts. Thus, the quick flanged joint of the present invention can offer large scale economy for materials, time, and field labor cost.

The semiconductor industry uses a large quatity of ductwork. Much of this must be installed after a building is in a "clean" condition. In addition to this, once a building is operational, changes are frequently made in the layout of equipment, the quantity, etc. In these periods of time, the installation of subsequent ductwork to connect tools becomes critical. There are strong objections to the uses of glues or adhesives or any materials that have odors in an operating semiconductor environment. There are automatic sensing devices installed in these facilities that have ranges down to parts per billion, and in the event any strange and unusual odors are detected, the alarm system goes off, and often the entire building is evacuated and the operation is shut down. This can cost an owner many millions of dollars for a relatively innocent incident. Thus, any kind of resin systems that potentially gives off an odor is deemed undesirable for making field joints. This includes virtually all kinds of resins which are available on the market. There are very few resin formulations which do not give off odors.

In addition to the odor problem, there is outgassing. Owners have become sensitive about any gases that might be given off by materials in a clean room even after they are cured. This has come under increasing scrutiny as the years have gone by. Therefore, if a material doesn't have an apparent odor on installation, the prospect that it might, over the long period of time, outgas components which could interfere with the production of the wafers and chips becomes suspects and unusable.

Fiberglass-reinforced plastic materials have an additional handicap on system change outs or retro-fits, in that most of them require some degree of sanding with a grinder and sanding discs, and thereafter the installation of a resin system plus various layers and types of glass fabric to make a field joint. These fabrics are prone to shed particulates which become entrained in the air stream. Any of them that might come to rest on wafers can destroy thousands of dollars worth of product. It is not uncommon when there is a retro-fit in an existing operating plant, to have to install hundreds of feet of duct and many dozens of fittings to accommodate new tooling. Therefore, the installation of fiberglass duct after the fact of the initial installation and startup becomes a very serious problem.

With the present invention, all of the materials used, other than the gasketing compound, can either be sheet metal such as stainless steel, or can be hardened and toughened plastics that lend themselves to being shaped and formed as shown in the various Figures. The need for a particular length of pipe can be determined by the workmen at the jobsite, and on fit-up the pipe or duct can be cut to length and prepared outside the building. However, an installer may wish to only cut the pipe to length, and do the rest of the assembly of this flanged system indoors. Since there is nothing being used that will give off odors, particulates, or dust in the process of the installation, there can be no objection to the use of this type of a device. Even the gasketing compound 14 has no odor and is used solely as a space filler for the small clearance that occurs between the outside of the internal slip collar and the inside of the ductwork.

There are virtually no cultural problems in understanding the methods of installation. Contractors in Indonesia, South America, Israel, China, Europe or the United States can look at an installation brochure and readily see how the parts of the flange systems are assembled in the field. It does not take a great deal of skill nor any specialized tools in order to make proper installation. The flange is a universal device.

FIRE RESISTANCE PROBLEMS

Factory Mutual Research Corporation is a large research and testing organization that sets many of the standards for fire resistance and fire performance in the semiconductor industry. They have severe fire tests for plastic ducts and their field joint materials. While a number of different kinds of fiberglass-reinforced plastic ducts have been tested by, and are listed by Factory Mutual, field joints are always a problem in fires. In one of the tests that Factory Mutual conducts, parts of the ductwork must be installed in a vertical configuration. The bottom four or five lineal feet of the ductwork may only be supported by its field joint attachment to the duct above.

A fire source consisting of a pan of heptane is placed on the floor roughly thirty inches beneath the bottom entry to the duct. This fire may be permitted to be free-flowing, similar to a stack fire, without a fan, or may go into ductwork connected to a fan which will pull the fire into the duct. Any type of joint system which relies on the use of elastomeric gaskets often will pose a problem, because the gaskets tend to melt and function as a lubricant at that first joint above the fire. Parts pull apart and the duct often collapses. Flanged joints of the virgin material, for example fiberglass, may also be used in the event it has the necessary fire resistance, similar to the duct. For example, ducts using phenol resins have fairly consistently passed the Factory Mutual Fire Test, but getting dimensionally stable flanges from a phenol resin is very difficult. Fiberglass flanges are very expensive compared to the use of steel, such as is shown in the present invention. In the present invention, gasketing materials are not required. They are optional and well constrained. While a paste is used between the internal slip coupling and the interior of the duct, this material itself is quite fire resistant because of its high content of fluoropolymer materials. There is very little of the material used in order to coat the internal slip coupling—only enough to aid in the assembly of the materials. If desired, this paste can be made an intumescent by the addition of such things as exfoliating graphite or glass flakes, or spumifics and/or halogens. These can provide additional fire protection at the joints.

The majority of the proposed field joint consists of steel, which has the projections 16 that bite into the exterior of the ductwork. In addition, these projections are further impressed into the exterior wall of the duct by the banding clamps 18. The bolts used 19 can be of the constant-torque type, so that in the event there is any expansion or shrinkage of the ductwork or joint during a fire, the constant-torque bolts will adjust for dimensional changes.

The preferred embodiment is to use steel for the entire flanged assembly because this is impervious to any flame impingement, will produce no smoke, will be more certain to dissipate any heat rapidly, and is low in cost.

Having now described the invention, it will be apparent to one of ordinary skill in the art that many changes and modifications may be made without departing from the spirit and scope of the invention as set forth herein.

What is claimed is:

1. A flange joint assembly for connecting together, end to end, two opposing cylindrical duct sections having interior and exterior walls, comprising
   a tubular slip collar having a projecting bead encircling its exterior surface thereby dividing its exterior surface into two opposing exterior portions,
   two metal flange ring clamps, each ring clamp having a plurality of notched flange leaf elements extending outwardly from a flat ring base,
   two band clamps, each band clamp having an annular ring and tightening means,
   whereby the tubular collar's exterior portions are mountable within the duct sections interior walls and having the projecting bead engaging the duct sections end walls,
   the two flange ring clamps are mountable around the the duct sections having the flat ring bases engaging the projecting bead and the notched leaf elements engaging the exterior duct surfaces, and
   the two band clamps annular rings mountable around the notched leaf elements secured by the tightening means thereto.

2. The flange joint assembly according to claim 1 wherein the metal flange ring clamps are fabricated from sheet metal.

3. The flange joint assembly according to claim 2 wherein the notched leaf elements have projections that penetrate the duct sections exterior wall surfaces.

4. The flange joint assembly according to claim 1 wherein a gasket compound is applied to at least a portion of the interior walls of the ducts and to the exterior surface portions of the tubular collar.

5. The flange joint assembly according to claim 3 wherein the flat ring base is welded to the notched leaf elements.

6. The flange joint assembly according to claim 1 wherein the tightening means for the band clamps are setup bolts releasably secured to the annular rings.

7. The flange joint assembly according to claim 1 wherein two V-band ring locking devices having annular wide rings with a lever operated locking devices encircle the metal flange ring clamps releasably securing them within the assembly.

8. The flange joint assembly according to claim 1 wherein two Van-Stone flange rings having a plurality of bolt holes encircled wide annular rings and securing bolts secure the opposing flange ring clamps together.

* * * * *